(12) United States Patent
Jang et al.

(10) Patent No.: US 8,462,764 B2
(45) Date of Patent: Jun. 11, 2013

(54) APPARATUS AND METHOD FOR TRANSMITTING AND RECEIVING AUTOMATIC REPEAT REQUEST FEEDBACK MESSAGE IN WIRELESS COMMUNICATION SYSTEM

(75) Inventors: Jae-Hyuk Jang, Suwon-si (KR); Young-Bin Chang, Anyang-si (KR); Rakesh Taori, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 425 days.

(21) Appl. No.: 12/760,996

(22) Filed: Apr. 15, 2010

(65) Prior Publication Data

US 2010/0269006 A1 Oct. 21, 2010

(30) Foreign Application Priority Data

Apr. 17, 2009 (KR) ........................ 10-2009-0033529

(51) Int. Cl.
*H04B 7/212* (2006.01)
(52) U.S. Cl.
USPC ........................... 370/348; 370/442; 714/748
(58) Field of Classification Search
USPC ................ 370/341–343, 348, 437, 439, 441, 370/442; 709/226, 237; 714/748–749
See application file for complete search history.

(56) References Cited

U.S. PATENT DOCUMENTS

| | | | | |
|---|---|---|---|---|
| 5,487,068 A | * | 1/1996 | Smolinske et al. | 714/748 |
| 6,377,548 B1 | * | 4/2002 | Chuah | 370/442 |
| 6,742,187 B1 | * | 5/2004 | Vogel | 370/341 |
| 6,778,509 B1 | * | 8/2004 | Ravishankar et al. | 370/348 |
| 6,901,049 B1 | * | 5/2005 | Chapman | 370/437 |
| 6,950,399 B1 | * | 9/2005 | Bushmitch et al. | 370/348 |
| 7,440,399 B2 | * | 10/2008 | Julian et al. | 370/342 |
| 7,729,665 B2 | * | 6/2010 | Sung et al. | 714/748 |
| 2002/0108082 A1 | * | 8/2002 | McDonnell | 714/748 |
| 2002/0141435 A1 | * | 10/2002 | Newberg et al. | 370/442 |
| 2003/0007508 A1 | * | 1/2003 | Sala et al. | 370/442 |
| 2007/0168826 A1 | | 7/2007 | Terry et al. | |
| 2007/0277074 A1 | | 11/2007 | Yeo et al. | |
| 2007/0280193 A1 | | 12/2007 | Kim et al. | |
| 2009/0094498 A1 | | 4/2009 | Kim et al. | |
| 2009/0175369 A1 | * | 7/2009 | Atarashi et al. | 714/748 |

* cited by examiner

*Primary Examiner* — Jeffrey M Rutkowski
(74) *Attorney, Agent, or Firm* — Jefferson IP Law, LLP

(57) ABSTRACT

An apparatus and a method for transmitting and receiving an Automatic Repeat reQuest (ARQ) feedback message in a wireless communication system are provided. A method for receiving an ARQ feedback message at a transmitting unit in a wireless communication system includes allocating a fixed-size resource for transmitting an ARQ feedback message, to a receiving unit, the resource being an unsolicited bandwidth, and receiving an ARQ feedback message or a resource request message from the receiving unit over the fixed-size resource allocated.

32 Claims, 8 Drawing Sheets

APPARATUS AND METHOD FOR TRANSMITTING AND RECEIVING AUTOMATIC REPEAT REQUEST FEEDBACK MESSAGE IN WIRELESS COMMUNICATION SYSTEM

PRIORITY

This application claims the benefit under 35 U.S.C. §119(a) of a Korean patent application filed in the Korean Intellectual Property Office on Apr. 17, 2009, and assigned Serial No. 10-2009-0033529, the entire disclosure of which is hereby incorporated by reference.

BACKGROUND OF THE INVENTION

1. Field of the Invention

The present invention relates to an apparatus and a method for transmitting and receiving an Automatic Repeat reQuest (ARQ) feedback message in a wireless communication system. More particularly, the present invention relates to an apparatus and a method for a receiving unit to transmit an ARQ feedback message without contention in a wireless communication system.

2. Description of the Related Art

According to a channel status of a radio resource, a wireless communication system can encounter an error in data transmitted and received. Hence, the wireless communication system controls or restores the data error using an Automatic Repeat reQuest (ARQ) scheme to raise transmission reliability.

Using the ARQ scheme, a receiving unit informs a transmitting unit of whether ARQ data is successfully received from the transmitting unit. For example, when the ARQ data received from the transmitting unit is free from an error, the receiving unit transmits ACKnowledge (ACK) information to the transmitting unit. When the ARQ data received from the transmitting unit is corrupted, the receiving unit transmits Negative ACK (NACK) information to the transmitting unit. Herein, a series of operations of the receiving unit for transmitting the reception success or failure of the ARQ data to the transmitting unit is referred to as an ARQ feedback.

Accordingly, the transmitting unit can acquire a reception status of the ARQ data transmitted to the receiving unit from the ACK/NACK information received from the receiving unit, and thus manages an ARQ window. When receiving the ACK information from the receiving unit, the transmitting unit updates the ARQ window and transmits new ARQ data to the receiving unit. In contrast, when receiving the NACK information from the receiving unit, the transmitting unit retransmits the ARQ data corresponding to the NACK information to the receiving unit without updating the ARQ window.

To transmit the ARQ feedback to the transmitting unit, the receiving unit needs an additional resource request, which may delay the ARQ feedback transmission. When the ARQ feedback transmission is delayed, the transmitting unit cannot additionally transmit the ARQ data, which adversely affects the entire system throughput. To avoid the delay of the ARQ feedback transmission, the transmitting unit transmits an ARQ feedback request message to the receiving unit and request the ARQ feedback in advance before the ARQ window is full. Despite of this request, severe contention and collision in the resource request for the ARQ feedback may increase the delay and adversely affect the entire system throughput.

A conventional method for the receiving unit to request the resource in the contention manner according to the ARQ feedback request message reception from the transmitting unit in the Institute of Electrical and Electronics Engineers (IEEE) standard 802.16e system is explained in five steps. When the transmitting unit transmits the ARQ feedback request message to the receiving unit, the receiving unit selects and transmits a random ranging code to the transmitting unit in step 1. Herein, the ranging code transmitted to the transmitting unit does not contain any information except for a code index. The transmitting unit allocates a resource for transmitting the resource request message to the receiving unit which transmits the ranging code, and transmits the corresponding resource allocation message to the receiving unit in step 2. If a plurality of receiving units transmits the ranging code at the same time, the ranging codes may collide and the ranging code transmission may fail. When the receiving unit does not receive the resource allocation message for the delivery of the resource request message after a certain time, the receiving unit repeats the selection and the transmission of a certain ranging code to the transmitting unit. The receiving unit, upon receiving the resource allocation message, transmits a resource request message including information such as an IDentifier (ID) of the receiving unit, a purpose of the resource request (to transmit the ARQ feedback) and a size of the requested resource, to the transmitting unit over the allocated resource in step 3. The transmitting unit receiving the resource request message allocates the resource for the ARQ feedback transmission to the receiving unit, and transmits a resource allocation message for the ARQ feedback transmission to the receiving unit in step 4. The receiving unit transmits the ARQ feedback to the transmitting unit over the allocated resource in step 5. That is, although an error does not occur during the five steps, the five steps are necessary for the ARQ feedback transmission. When an error occurs in the process of the five steps, the process from the first step should be repeated. As a result, the delay of the ARQ feedback transmission increases and blocks the ARQ data transmission of the transmitting unit.

Therefore, a need exists for an apparatus and method for reducing transmission delay of an ARQ feedback message in a wireless communication system.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for transmitting and receiving an Automatic Repeat reQuest (ARQ) feedback message in a wireless communication system.

Another aspect of the present invention is to provide an apparatus and a method for a receiving unit to transmit an ARQ feedback message without contention in a wireless communication system.

Yet another aspect of the present invention is to provide an apparatus and a method for transmitting and receiving an ARQ feedback message to decrease transmission delay of the ARQ feedback message and to enhance total system throughput by raising an ARQ window update speed in a wireless communication system.

In accordance with an aspect of the present invention, a method for receiving an ARQ feedback message at a transmitting unit in a wireless communication system is provided. The method includes allocating a fixed-size resource for transmitting an ARQ feedback message, to a receiving unit, the resource being an unsolicited bandwidth, and receiving an ARQ feedback message or a resource request message from the receiving unit over the fixed-size resource allocated.

In accordance with another aspect of the present invention, a method for transmitting an ARQ feedback message at a receiving unit in a wireless communication system is provided. The method includes being allocated a fixed-size resource for transmitting an ARQ feedback message from a transmitting unit, the resource being an unsolicited bandwidth, when the fixed size of the allocated resource is greater than or equal to a size of a necessary resource for actually transmitting an ARQ feedback message, transmitting the ARQ feedback message to the transmitting unit over the fixed-size resource allocated, and when the fixed size of the allocated resource is less than the size of the necessary resource for actually transmitting the ARQ feedback message, transmitting a resource request message to the transmitting unit over the fixed-size resource allocated.

In accordance with yet another aspect of the present invention, an apparatus for receiving an ARQ feedback message at a transmitting unit in a wireless communication system is provided. The apparatus includes a resource allocator for allocating a fixed-size resource for transmitting an ARQ feedback message, to a receiving unit, the resource being an unsolicited bandwidth, and a receiving unit for receiving an ARQ feedback message or a resource request message from the receiving unit over the fixed-size resource allocated.

In accordance with still another aspect of the present invention, an apparatus for transmitting an ARQ feedback message at a receiving unit in a wireless communication system is provided. The apparatus includes an ARQ controller being allocated a fixed-size resource for transmitting an ARQ feedback message from a transmitting unit, the resource being an unsolicited bandwidth, comparing the fixed size of the allocated resource with a size of a necessary resource for actually transmitting an ARQ feedback message, and controlling a transmitting unit to transmit an ARQ feedback message or a resource request message to the transmitting unit over the fixed-size resource allocated according to a result of the comparison, and the transmitting unit for transmitting the ARQ feedback message to the transmitting unit over the fixed-size resource allocated when the fixed size of the allocated resource is greater than or equal to the size of the necessary resource for actually transmitting the ARQ feedback message, and transmitting a resource request message to the transmitting unit over the fixed-size resource allocated when the fixed size of the allocated resource is less than the size of the necessary resource for actually transmitting the ARQ feedback message.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

Figure 1:
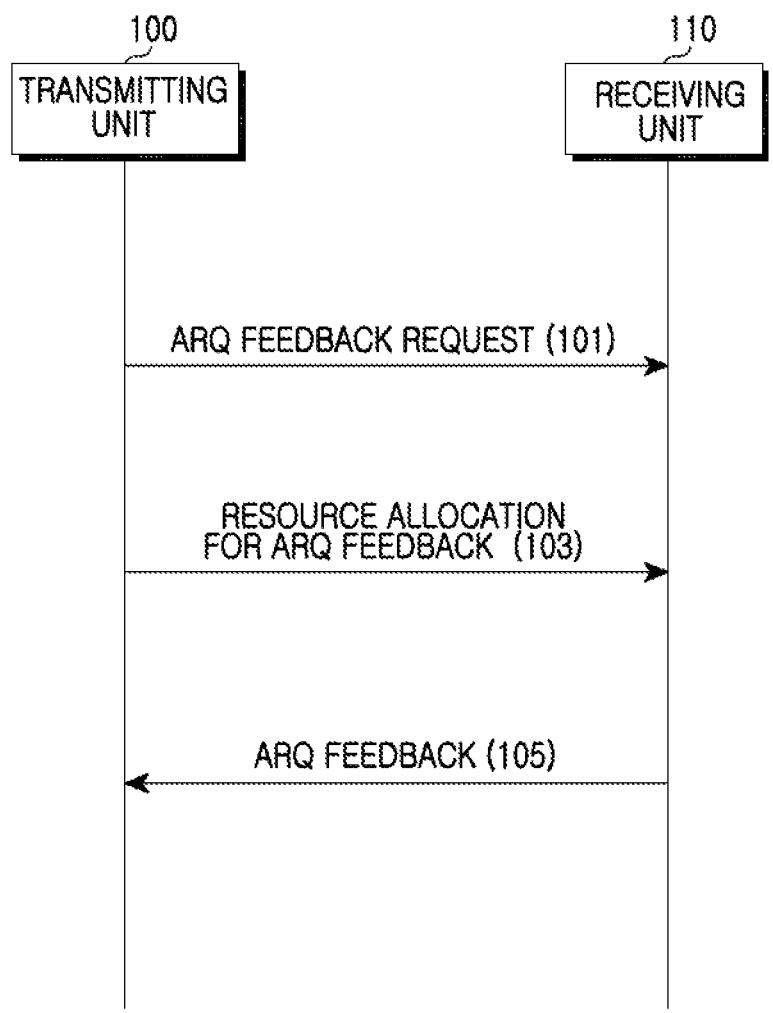
FIG. 1 illustrates a process of a receiving unit for transmitting an ARQ feedback message without contention in a wireless communication system according to an exemplary embodiment of the present invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein may be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, a measurement error, measurement accuracy limitations and other factors known to skill in the art, may occur in amounts that do not preclude the effect the characteristic was intended to provide.

Exemplary embodiments of the present invention provide an apparatus and a method for a receiving unit to transmit an Automatic Repeat reQuest (ARQ) feedback message without contention in a wireless communication system. Herein, the ARQ feedback message includes ACKnowledge (ACK) information indicating no error in ARQ data received from a transmitting unit, or Negative ACK (NACK) information indicating an error in ARQ data received from the transmitting unit. Hereinafter, the transmitting unit represents a base station and the receiving unit represents a terminal. While the ARQ feedback message is requested in order to update an ARQ window as an example, it should be appreciated that the ARQ feedback message may be requested for various purposes.

In an exemplary implementation, various types of methods for transmitting the ARQ feedback message are described. The types of methods for transmitting the ARQ feedback message include a cumulative ACK scheme, a selective ACK scheme, and the like.

In the cumulative ACK scheme, the receiving unit transmits a sequence number of an ARQ block having the greatest sequence number among ARQ blocks successfully received before the first corrupted ARQ block, to the transmitting unit. For example, when the receiving unit receives 10 of 12 ARQ blocks from the transmitting unit and $4^{th}$, $5^{th}$, $7^{th}$ and $9^{th}$ ARQ blocks are compromised, the receiving unit may transmit the sequence number of a $3^{rd}$ ARQ block to the transmitting unit. Accordingly, using the cumulative ACK scheme, the receiving unit is allocated the fixed-size resource and transmits the ARQ feedback message to the transmitting unit. For example, the receiving unit may be assigned the fixed-size resource according to an ARQ window size.

In the selective ACK scheme, the receiving unit transmits ACK/NACK information of the ACK block using a bitmap constituted by allocating one bit per ARQ block. For example, for 10 ARQ blocks received from the transmitting unit, the receiving unit transmits the ACK/NACK information of 4 ARQ blocks from a $2^{nd}$ ARQ block to the transmitting unit or the ACK/NACK information of 8 ARQ blocks from the $2^{nd}$ ARQ block to the transmitting unit. As such, the receiving unit may transmit the ACK/NACK information in various manners. Using the selective ACK scheme, the receiving unit is assigned a variable-size resource and transmits the ARQ feedback message to the transmitting unit.

FIG. 1 illustrates a process of a receiving unit for transmitting an ARQ feedback message without contention in a wireless communication system according to an exemplary embodiment of the present invention. More particularly, FIG. 1 depicts a process of the receiving unit for transmitting the ARQ feedback message using a dedicated resource allocated from a transmitting unit without requesting a separate contention-type resource to the transmitting unit.

Referring to FIG. 1, after transmitting ARQ data to the receiving unit 110, when requiring to receive an ARQ feedback message because of an ARQ window update, the transmitting unit 100 requests to transmit the ARQ feedback message of the ARQ data by transmitting an ARQ feedback request message to the receiving unit 110 in step 101. Herein, the transmitting unit 100 may constitute the ARQ feedback request message in the form of an extension header, constitute a Media Access Control (MAC) Protocol Data Unit (MPDU) by attaching the ARQ feedback request message to data in a MAC layer, and transmit them to the receiving unit 110. Alternatively, the transmitting unit 100 may constitute and transmit the ARQ feedback request message as an independent control message to the receiving unit 110.

The transmitting unit 100 allocates a dedicated resource for transmitting the ARQ feedback message to the receiving unit 110, generates and transmits a corresponding resource allocation message to the receiving unit 110 in step 103. Herein, the dedicated resource, which is an unsolicited bandwidth, has a fixed size to transmit the ARQ feedback message of the cumulative ACK scheme. For example, the dedicated resource may have the fixed size according to the ARQ window size. The resource allocation message is constituted and transmitted as a control message (e.g., A-MAP message). Herein, brief resource allocation information such as resource allocation time or size of the allocated resource may be discussed between the transmitting unit 100 and the receiving unit 110 at an initial system access. Alternatively, the transmitting unit 100 may be able to determine the resource allocation time or the size of the allocated resource and transmit the ARQ feedback request message including this information to the receiving unit 110.

The receiving unit 110, which is allocated the dedicated resource for transmitting the ARQ feedback message from the transmitting unit 100, compares the size of the allocated dedicated resource with the size of a resource required to actually transmit the ARQ feedback message.

When the size of the resource required to actually transmit the ARQ feedback message is less than or equal to the size of the allocated dedicated resource, the receiving unit 110 determines that it is possible to transmit the ARQ feedback message over the allocated dedicated resource, and transmits the ARQ feedback message to the transmitting unit 100 over the allocated dedicated resource in step 105. For example, when the receiving unit 110 determines to transmit the ARQ feedback message of the cumulative ACK scheme, or when the receiving unit 110 determines to transmit the ARQ feedback message of the selective ACK scheme but the size of the required resource for transmitting the ARQ feedback message is less than or equal to the size of the dedicated resource allocated from the transmitting unit 100, the receiving unit 110 may determine that the allocated bandwidth is enough to transmit the ARQ feedback message, and thus determine that it is possible to transmit the ARQ feedback message over the allocated dedicated resource. Herein, the receiving unit 110 may constitute the ARQ feedback message as the extension header, constitute the MPDU by attaching the ARQ feedback request message to data in the MAC layer, and transmit them to the transmitting unit 100. Alternatively, the receiving unit 110 may constitute and transmit the ARQ feedback message as a separate independent control message to the transmitting unit 100. Hence, the receiving unit 110 may transmit the ARQ feedback message to the transmitting unit 100 without requesting a separate contention-type resource.

When the size of the resource required to actually transmit the ARQ feedback message is greater than the size of the allocated dedicated resource, the receiving unit 110 determines that it is infeasible to transmit the ARQ feedback message over the allocated dedicated resource, and transmits a resource request message for requesting the allocation of the necessary resource to transmit the ARQ feedback message instead of the ARQ feedback message to the transmitting unit 100 over the allocated dedicated resource. For example, when the receiving unit 110 determines to transmit the ARQ feedback message of the selective ACK scheme and the size of the necessary resource for transmitting the ARQ feedback message is greater than the size of the dedicated resource allocated from the transmitting unit 100, the receiving unit 110 may determine that the allocated bandwidth is insufficient to transmit the ARQ feedback message. Accordingly, the receiving unit 110 may determine that it is infeasible to transmit the ARQ feedback message through the allocated dedicated resource. At this time, the receiving unit 110 should be allocated the resource of the necessary size by requesting the size of the necessary resource for transmitting the ARQ feedback message of the selective ACK scheme to the transmitting unit 100. As such, a case where the size of the necessary resource for delivering the ARQ feedback message is greater than the size of the dedicated resource allocated is illustrated in FIG. 2, which is described in more detail below.

Figure 2:
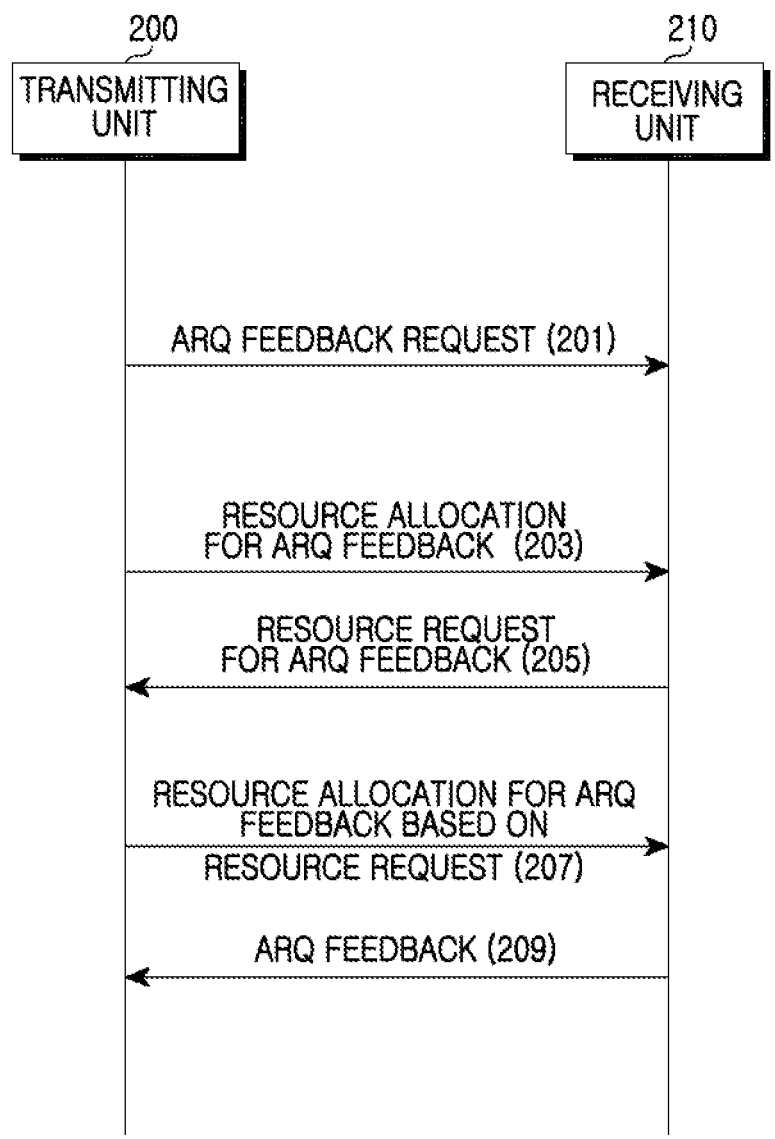
FIG. 2 illustrates a process of a receiving unit for transmitting an ARQ feedback message without contention in a wireless communication system according to an exemplary embodiment of the present invention.

FIG. 2 illustrates a process of a receiving unit for transmitting an ARQ feedback message without contention in a wireless communication system according to an exemplary embodiment of the present invention. More particularly, FIG. 2 depicts a process of the receiving unit for requesting additional resource using a dedicated resource allocated from a transmitting unit and for transmitting the ARQ feedback message to the transmitting unit over the requested resource.

Referring to FIG. 2, after transmitting ARQ data to the receiving unit 210, when it is necessary to receive an ARQ feedback message because of an ARQ window update, the transmitting unit 200 requests to transmit the ARQ feedback message of the ARQ data by transmitting an ARQ feedback request message to the receiving unit 210 in step 201. Herein, the transmitting unit 200 may constitute the ARQ feedback request message in the form of an extension header, constitute a MPDU by attaching the ARQ feedback request message to data in the MAC layer, and transmit them to the receiving unit 210. Alternatively, the transmitting unit 200 may constitute and transmit the ARQ feedback request message as an independent control message to the receiving unit 210.

The transmitting unit 200 allocates a dedicated resource for transmitting the ARQ feedback message to the receiving unit 210, and generates and transmits a corresponding resource allocation message to the receiving unit 210 in step 203. Herein, the dedicated resource, which is an unsolicited bandwidth, has a fixed size to transmit the ARQ feedback message of a cumulative ACK scheme. For example, the dedicated resource may have a fixed size according to an ARQ window size. The resource allocation message is constituted and transmitted as a control message (e.g., A-MAP message). Herein, brief resource allocation information such as resource allocation time or size of the allocated resource may be discussed between the transmitting unit 200 and the receiving unit 210 at an initial system access. Alternatively, the transmitting unit 200 may be able to determine the resource allocation time or the size of the allocated resource and transmit the ARQ feedback request message including this information to the receiving unit 210.

The receiving unit 210, which is allocated the dedicated resource for transmitting the ARQ feedback message from the transmitting unit 200, compares the size of the allocated dedicated resource with the size of a resource required to actually transmit the ARQ feedback message.

When the size of the resource required to actually transmit the ARQ feedback message is greater than the size of the allocated dedicated resource, the receiving unit 210 determines that it is impossible to transmit the ARQ feedback message over the allocated dedicated resource and transmits a resource request message requesting to allocate the necessary resource for actually transmitting the ARQ feedback message, instead of the ARQ feedback message, to the transmitting unit 200 over the allocated dedicated resource in step 205. For example, when the receiving unit 210 determines to transmit the ARQ feedback message of a selective ACK scheme and the size of the necessary resource for transmitting this ARQ feedback message is greater than the size of the dedicated resource allocated from the transmitting unit 200, the receiving unit 210 may determine that the allocated bandwidth is insufficient to transmit the ARQ feedback message and thus determine that it is impossible to transmit the ARQ feedback message through the allocated dedicated resource. Hence, the receiving unit 210 should request the size of the necessary resource for transmitting the ARQ feedback message of the selective ACK scheme and be allocated the resource in the necessary size. Herein, the receiving unit 210 may constitute the resource request message in the form of the extension header, constitute the MPDU by attaching the ARQ feedback request message to data in the MAC layer, and transmit them to the transmitting unit 200. Alternatively, the receiving unit 210 may constitute the resource request message as an independent control message and transmit it to the transmitting unit 200.

When the size of the necessary resource for actually transmitting the ARQ feedback message is less than or equal to the size of the dedicated resource allocated, the receiving unit 210 determines that it is possible to transmit the ARQ feedback message over the allocated dedicated resource, and transmit the ARQ feedback message to the transmitting unit 200 through the allocated dedicated resource. For example, when the receiving unit 210 determines to transmit the ARQ feedback message of the cumulative ACK scheme, or when the receiving unit 210 determines to transmit the ARQ feedback message of the selective ACK scheme but the size of the required resource for transmitting the ARQ feedback message is less than or equal to the size of the dedicated resource allocated from the transmitting unit 200, the receiving unit 210 may determine that the allocated bandwidth is enough to transmit the ARQ feedback message. Thus, the receiving unit 210 may determine that it is possible to transmit the ARQ feedback message over the allocated dedicated resource. A case where the size of the necessary resource for actually transmitting the ARQ feedback message is less than or equal to the size of the allocated dedicated resource has been described above with reference to FIG. 1.

The transmitting unit 200 receiving the resource request message from the receiving unit 210 allocates the resource required for the receiving unit 210 to actually transmit the ARQ feedback message, based on the received resource request message, generates and transmits the corresponding resource allocation message to the receiving unit 210 in step 207. Herein, the resource allocation message transmitted is constituted in the form of a control message.

The receiving unit 210, which is allocated the resource required to actually transmit the ARQ feedback message from the transmitting unit 200, transmits an ARQ feedback message to the transmitting unit 200 over the allocated resource in step 209. Herein, the receiving unit 210 may constitute the ARQ feedback message as the extension header, and constitute the MPDU by attaching the ARQ feedback request message to data in the MAC layer and transmit them to the transmitting unit 200. Alternatively, the receiving unit 210 may constitute the ARQ feedback message as an independent control message and transmit it to the transmitting unit 200. Thus, the receiving unit 210 may transmit the ARQ feedback message to the transmitting unit 200 without a separate contention-type resource request.

Meanwhile, in an exemplary implementation, after transmitting the ARQ feedback request message to the receiving unit, the transmitting unit may allocate a dedicated ranging code for transmitting the ARQ feedback message to the receiving unit. As receiving the allocated dedicated ranging code, the dedicated resource for transmitting the ARQ feedback message may be allocated, which is described in more detail with reference to FIGS. 3 and 4 below.

Figure 3:
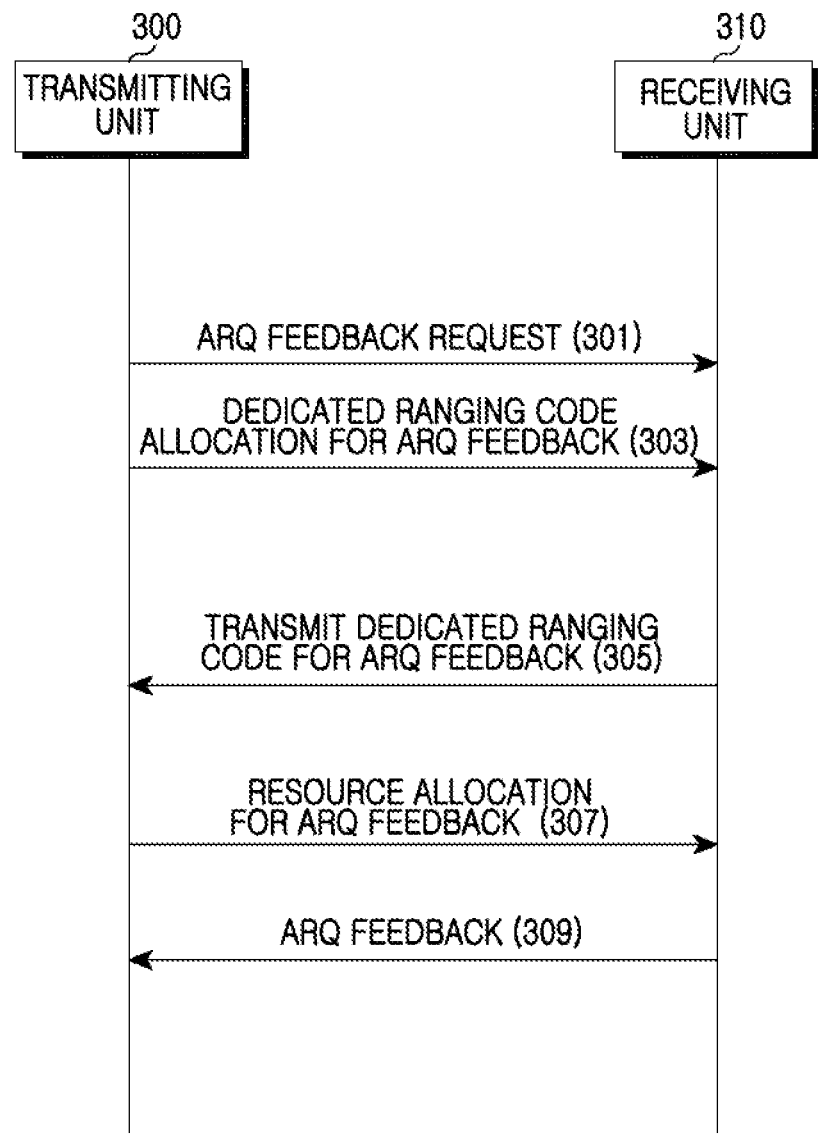
FIG. 3 illustrates a process of a receiving unit for transmitting an ARQ feedback message without contention in a wireless communication system according to an exemplary embodiment of the present invention.

FIG. 3 illustrates a process of a receiving unit for transmitting an ARQ feedback message without contention in a wireless communication system according to an exemplary embodiment of the present invention. In an exemplary implementation, FIG. 3 includes a process of the receiving unit for being allocated the dedicated ranging code to transmit the ARQ feedback message from a transmitting unit and for being allocated the dedicated resource for transmitting the ARQ feedback message from the transmitting unit by transmitting the dedicated ranging code to the transmitting unit.

Referring to FIG. 3, after transmitting ARQ data to the receiving unit 310, when it is necessary to receive an ARQ feedback message because of an ARQ window update, the transmitting unit 300 requests to transmit an ARQ feedback message of the ARQ data by transmitting an ARQ feedback request message to the receiving unit 310 in step 301. Herein, the transmitting unit 300 may constitute the ARQ feedback request message in the form of an extension header, constitute a MPDU by attaching the ARQ feedback request message to data in a MAC layer, and transmit them to the receiving unit 310. Alternatively, the transmitting unit 300 may constitute and transmit the ARQ feedback request message as an independent control message to the receiving unit 310.

In addition, for the rapid allocation of the dedicated resource for transmitting the ARQ feedback message, the transmitting unit 300 allocates the dedicated ranging code for transmitting the ARQ feedback message to the receiving unit 310, generates and transmits a corresponding dedicated ranging code allocation message to the receiving unit 310 in step 303.

When the receiving unit 310 is ready to transmit the ARQ feedback message, the receiving unit 310, which is allocated the dedicated ranging code for transmitting the ARQ feedback message, transmits the dedicated ranging code to the transmitting unit 300 in step 305.

The transmitting unit 300 receiving the dedicated ranging code from the receiving unit 310, allocates the receiving unit 310 the dedicated resource for transmitting the ARQ feedback message, generates and transmits a corresponding resource allocation message to the receiving unit 310 in step 307. Herein, the dedicated resource, which is an unsolicited bandwidth, has a fixed size to carry the ARQ feedback message of a cumulative ACK scheme. For example, the dedicated resource may have the fixed size according to an ARQ window size. The resource allocation message is constituted and transmitted as a control message (e.g., A-MAP message). Herein, brief resource allocation information such as resource allocation time or size of the allocated resource may be discussed between the transmitting unit 300 and the receiving unit 310 at an initial system access. Alternatively, the transmitting unit 300 may be able to determine the resource allocation time or the size of the allocated resource and transmit the ARQ feedback request message including this information to the receiving unit 310.

The receiving unit 310, which is allocated the dedicated resource for transmitting the ARQ feedback message from the transmitting unit 300, compares the size of the allocated dedicated resource with the size of a resource required to actually transmit the ARQ feedback message.

When the size of the resource required to transmit the ARQ feedback message is less than or equal to the size of the allocated dedicated resource, the receiving unit 310 determines that it is possible to transmit the ARQ feedback message over the allocated dedicated resource, and transmits the ARQ feedback message to the transmitting unit 300 over the allocated dedicated resource in step 309. For example, when the receiving unit 310 determines to transmit the ARQ feedback message of the cumulative ACK scheme, or when the receiving unit 310 determines to transmit the ARQ feedback message of a selective ACK scheme, but the size of the required resource for transmitting the ARQ feedback message is less than or equal to the size of the dedicated resource allocated from the transmitting unit 300, the receiving unit 310 may determine that the allocated bandwidth is enough to transmit the ARQ feedback message. Thus, the receiving unit 310 may determine that it is possible to transmit the ARQ feedback message over the allocated dedicated resource. Herein, the receiving unit 310 may constitute the ARQ feedback message as the extension header, constitute the MPDU by attaching the ARQ feedback request message to data in the MAC layer, and transmit them to the transmitting unit 300. Alternatively, the receiving unit 310 may constitute and transmit the ARQ feedback message as a separate independent control message to the transmitting unit 300. Hence, the receiving unit 310 may transmit the ARQ feedback message to the transmitting unit 300 without requesting a contention-type resource.

When the size of the resource required to actually transmit the ARQ feedback message is greater than the size of the allocated dedicated resource, the receiving unit 310 determines that it is infeasible to transmit the ARQ feedback message over the allocated dedicated resource, and transmits a resource request message for requesting the allocation of the necessary resource to transmit the ARQ feedback message, instead of the ARQ feedback message, to the transmitting unit 300 over the allocated dedicated resource. For example, when the receiving unit 310 determines to transmit the ARQ feedback message of the selective ACK scheme and the size of the necessary resource for transmitting the ARQ feedback message is greater than the size of the dedicated resource allocated from the transmitting unit 300, the receiving unit 310 may determine that the allocated bandwidth is insufficient to transmit the ARQ feedback message. Accordingly, the receiving unit 310 may determine that it is infeasible to transmit the ARQ feedback message through the allocated dedicated resource. At this time, the receiving unit 310 should be allocated the resource of the necessary size by requesting the size of the necessary resource for transmitting the ARQ feedback message of the selective ACK scheme to the transmitting unit 300. As such, a case where the size of the necessary resource for delivering the ARQ feedback message is greater than the size of the dedicated resource allocated is illustrated in FIG. 4, which is described in more detail below.

Figure 4:
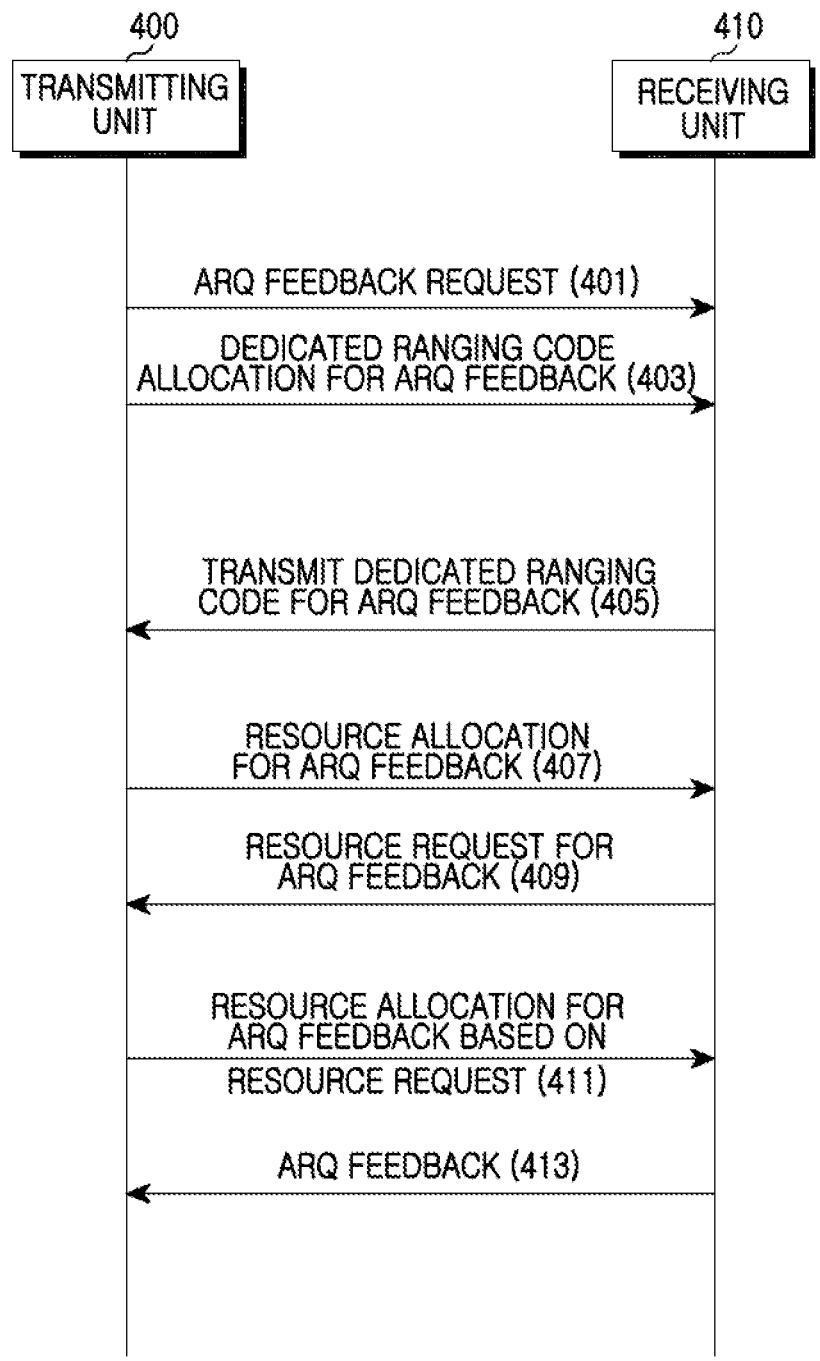
FIG. 4 illustrates a process of a receiving unit for transmitting an ARQ feedback message without contention in a wireless communication system according to an exemplary embodiment of the present invention.

FIG. 4 illustrates a process of a receiving unit for transmitting an ARQ feedback message without contention in a wireless communication system according to an exemplary embodiment of the present invention. In an exemplary implementation, FIG. 4 includes a process of the receiving unit for being allocated a dedicated ranging code to transmit the ARQ feedback message from a transmitting unit and for being allocated the dedicated resource for transmitting the ARQ feedback message from the transmitting unit by transmitting the dedicated ranging code to the transmitting unit.

Referring to FIG. 4, after transmitting ARQ data to the receiving unit 410, when it is necessary to receive an ARQ feedback message because of an ARQ window update, the transmitting unit 400 requests to transmit an ARQ feedback message of the ARQ data by transmitting an ARQ feedback request message to the receiving unit 410 in step 401. Herein, the transmitting unit 400 may constitute the ARQ feedback request message in the form of an extension header, constitute a MPDU by attaching the ARQ feedback request message to data in a MAC layer, and transmit them to the receiving unit 410. Alternatively, the transmitting unit 400 may constitute and transmit the ARQ feedback request message as an independent control message to the receiving unit 410.

In addition, for a rapid allocation of the dedicated resource for transmitting the ARQ feedback message, the transmitting unit 400 allocates the dedicated ranging code for transmitting the ARQ feedback message to the receiving unit 410, generates and transmits a corresponding dedicated ranging code allocation message to the receiving unit 410 in step 403.

When it is ready to transmit the ARQ feedback message, the receiving unit 410, which is allocated the dedicated ranging code for transmitting the ARQ feedback message, transmits the dedicated ranging code to the transmitting unit 400 in step 405.

The transmitting unit 400 receiving the dedicated ranging code from the receiving unit 410, allocates the receiving unit 410 the dedicated resource for transmitting the ARQ feedback message, generates and transmits a corresponding resource allocation message to the receiving unit 410 in step 407. Herein, the dedicated resource, which is an unsolicited bandwidth, has a fixed size to transmit the ARQ feedback message of a cumulative ACK scheme. For example, the dedicated resource may have a fixed size according to the ARQ window size. The resource allocation message is constituted and transmitted as a control message (e.g., A-MAP message). Herein, brief resource allocation information such as resource allocation time or size of the allocated resource may be discussed between the transmitting unit 400 and the receiving unit 410 at an initial system access. Alternatively, the transmitting unit 400 may be able to determine the resource allocation time or the size of the allocated resource and transmit the ARQ feedback request message including this information to the receiving unit 410.

The receiving unit 410, which is allocated the dedicated resource for transmitting the ARQ feedback message from the transmitting unit 400, compares the size of the allocated dedicated resource with the size of a resource required to actually transmit the ARQ feedback message.

When the size of the resource required to transmit the ARQ feedback message is greater than the size of the allocated dedicated resource, the receiving unit 410 determines that it is infeasible to transmit the ARQ feedback message over the allocated dedicated resource. The receiving unit 410 then transmits a resource request message for requesting the allocation of the necessary resource to transmit the ARQ feedback message, instead of the ARQ feedback message, to the transmitting unit 400 over the allocated dedicated resource in step 409. For example, when the receiving unit 410 determines to transmit the ARQ feedback message of a selective ACK scheme and the size of the necessary resource for transmitting the ARQ feedback message is greater than the size of the dedicated resource allocated from the transmitting unit 400, the receiving unit 410 may determine that the allocated bandwidth is insufficient to transmit the ARQ feedback message. Accordingly, the receiving unit 410 may determine that it is infeasible to transmit the ARQ feedback message through the allocated dedicated resource. At this time, the receiving unit 410 should be allocated the resource of the necessary size by requesting the size of the necessary resource for transmitting the ARQ feedback message of the selective ACK scheme to the transmitting unit 400. Herein, the receiving unit 410 may constitute the resource request message as the extension header, constitute the MPDU by attaching the ARQ feedback request message to data in the MAC layer, and transmit them to the transmitting unit 400. Alternatively, the receiving unit 410 may constitute the resource request message as an independent control message and transmit it to the transmitting unit 400.

When the size of the resource required to transmit the ARQ feedback message is less than or equal to the size of the allocated dedicated resource, the receiving unit 410 determines that it is possible to transmit the ARQ feedback message over the allocated dedicated resource. The receiving unit 410 transmits the ARQ feedback message to the transmitting unit 400 over the allocated dedicated resource. For example, when the receiving unit 410 determines to transmit the ARQ feedback message of the cumulative ACK scheme, or when the receiving unit 410 determines to transmit the ARQ feedback message of the selective ACK scheme but the size of the required resource for transmitting the ARQ feedback message is less than or equal to the size of the dedicated resource allocated from the transmitting unit 400, the receiving unit 410 may determine that the allocated bandwidth is enough to transmit the ARQ feedback message, and thus determine that it is possible to transmit the ARQ feedback message over the allocated dedicated resource. A case where the size of the necessary resource for actually transmitting the ARQ feedback message is less than or equal to the size of the allocated dedicated resource has been described above with reference to FIG. 3.

The transmitting unit 400 receiving the resource request message from the receiving unit 410, allocates the resource actually required by the receiving unit 410 to transmit the ARQ feedback message based on the received resource request message, generates and transmits a corresponding resource allocation message to the receiving unit 410 in step 411. Herein, the resource allocation message transmitted is constituted as the control message.

The receiving unit 410, which is allocated the necessary resource for actually transmitting the ARQ feedback message from the transmitting unit 400, transmits the ARQ feedback message to the transmitting unit 400 over the allocated resource in step 413. Herein, the receiving unit 410 may constitute the ARQ feedback message as the extension header, constitute the MPDU by attaching the ARQ feedback request message to data in the MAC layer, and transmit them to the transmitting unit 400. Alternatively, the receiving unit 410 may constitute and transmit the ARQ feedback message as a separate independent control message to the transmitting unit 400. Hence, the receiving unit 410 may transmit the ARQ feedback message to the transmitting unit 400 without a contention-type resource request.

In an exemplary implementation, when the dedicated ranging code is used to transmit the ARQ feedback message, it is possible to reduce collisions caused when several receiving units transmit a certain ranging code at the same time and thus to decrease a possibility of the ranging code transmission failure. As the transmitting unit receives from the receiving unit the dedicated ranging code allocated to transmit the ARQ feedback message, the transmitting unit immediately allocates the dedicated resource for transmitting the ARQ feedback message. Accordingly, it is possible to omit an operation of the transmitting unit for transmitting the resource allocation message to transmit the resource request message to the receiving unit which transmits a certain ranging code and the operation of the receiving unit for transmitting the resource request message to the transmitting unit in the conventional method. Consequently, a transmission delay of the ARQ feedback message may be reduced.

Figure 5:
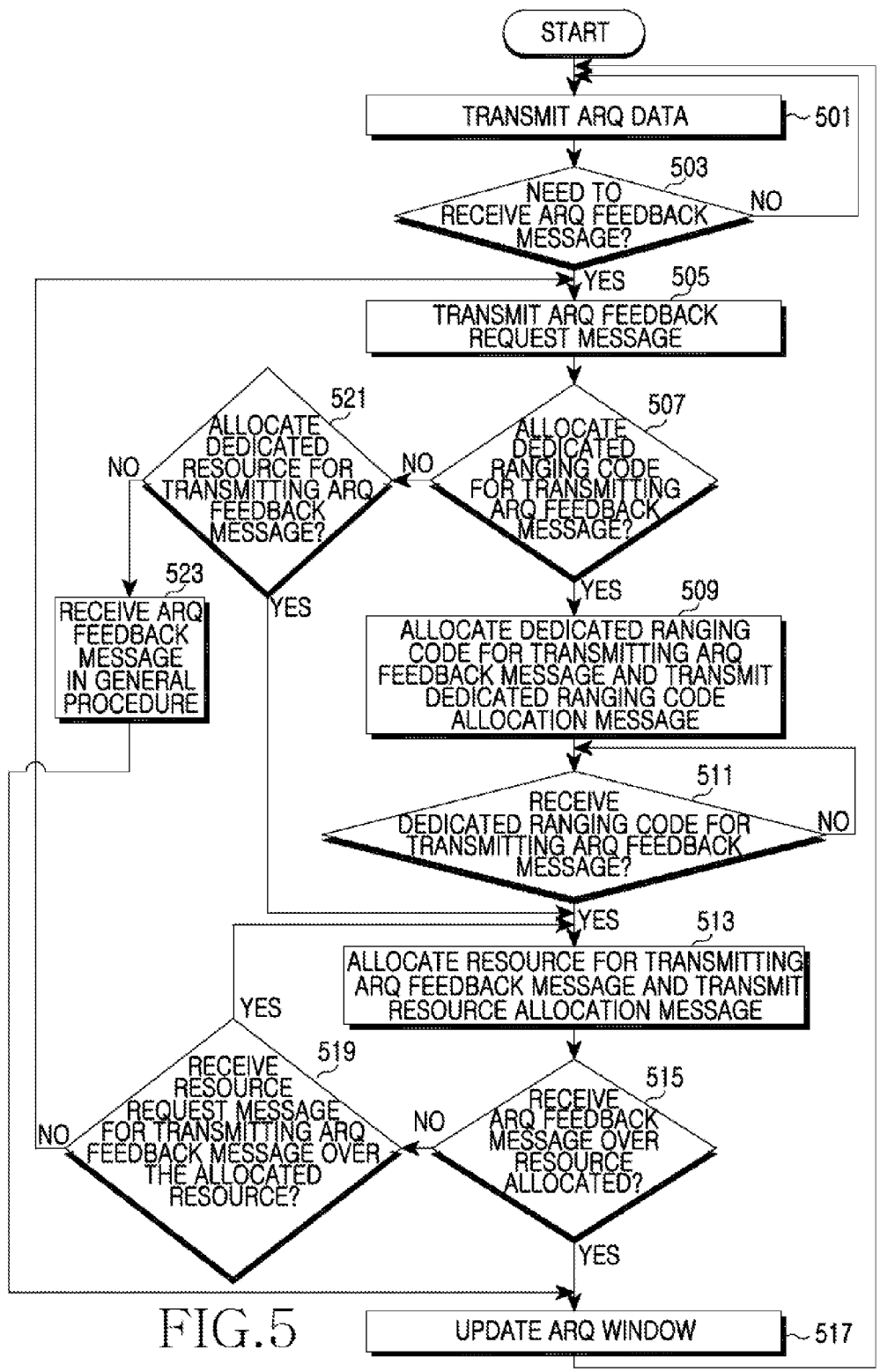
FIG. 5 illustrates a process of a transmitting unit for receiving an ARQ feedback message in a wireless communication system according to an exemplary embodiment of the present invention.

FIG. 5 illustrates a process of a transmitting unit for receiving an ARQ feedback message in a wireless communication system according to an exemplary embodiment of the present invention.

Referring to FIG. 5, the transmitting unit transmits an ARQ data to the receiving unit in step 501 and examines whether the reception of the ARQ feedback message is required to update an ARQ window in step 503.

In step 503, when the reception of the ARQ feedback message is not required, the transmitting unit returns to step 501 and repeats the subsequent step.

In step 503, when it is necessary to receive the ARQ feedback message, the transmitting unit requests to transmit the ARQ feedback message for the ARQ data by transmitting the ARQ feedback request message to the receiving unit in step 505. Herein, the transmitting unit may constitute the ARQ feedback request message as an extension header, constitute a MPDU by attaching the ARQ feedback request message to data in a MAC layer, and transmit them to the receiving unit. Alternatively, the transmitting unit may constitute and transmit the ARQ feedback request message as an independent control message to the receiving unit.

In step 507, the transmitting unit determines whether to allocate the receiving unit the dedicated ranging code for transmitting the ARQ feedback message for fast allocation of the dedicated resource.

If it is determined to allocate the dedicated ranging code for transmitting the ARQ feedback message in step 507, the transmitting unit allocates the receiving unit the dedicated ranging code for transmitting the ARQ feedback message, and generates and transmits the corresponding dedicated ranging code allocation message to the receiving unit in step 509. Herein, the dedicated ranging code allocation message includes information relating to the dedicated ranging code and the allocation purpose of the dedicated ranging code (to transmit the ARQ feedback message).

In step 511, the transmitting unit determines whether the dedicated ranging code allocated for transmitting the ARQ feedback message is received from the receiving unit.

If it is determined that the transmitting unit receives the allocated dedicated ranging code in step 511, the transmitting unit allocates the dedicated resource for transmitting the ARQ feedback message to the receiving unit, generates and transmits a corresponding resource allocation message to the receiving unit in step 513. Herein, the dedicated resource, which is an unsolicited bandwidth, has a fixed size to deliver the ARQ feedback message of a cumulative ACK scheme. For example, the dedicated resource may have the fixed size according to the ARQ window size. The resource allocation message is constituted and transmitted as a control message (e.g., A-MAP message), and includes information relating to an ID of the receiving unit and a resource allocation size. Herein, brief resource allocation information such as resource allocation time or size of the allocated resource may be discussed between the transmitting unit and the receiving unit at an initial system access. Alternatively, the transmitting unit may be able to determine the resource allocation time or the size of the allocated resource and transmit the ARQ feedback request message including this information to the receiving unit.

In step 515, the transmitting unit determines whether the ARQ feedback message is received from the receiving unit over the allocated dedicated resource. Herein, the transmitting unit may determine which message is received in the allocated dedicated resource by analyzing header information of the received message.

Upon receiving the ARQ feedback message in step 515, the transmitting unit updates the ARQ window using the received ARQ feedback message in step 517 and returns to step 501 to repeat the subsequent step.

In contrast, if it is determined that the transmitting unit does not receive the ARQ feedback message in step 515, the transmitting unit determines whether the resource request message requesting to allocate the necessary resource for actually transmitting the ARQ feedback message is received from the receiving unit over the allocated dedicated resource in step 519. Herein, the resource request message includes the information relating to the ID of the receiving unit, the purpose of the resource request (to deliver the ARQ feedback message), and the resource request size.

When the transmitting unit receives the resource request message in step 519, the transmitting unit returns to step 513 to allocate the resource required by the receiving unit to transmit the ARQ feedback message based on the received resource request message, generates and transmits the corresponding resource allocation message to the receiving unit. Thereafter, the transmitting unit repeats the subsequent steps.

When the transmitting unit does not receive the resource request message in step 519, the transmitting unit retransmits the ARQ feedback request message to the receiving unit in step 505 and then repeats the subsequent steps.

In step 507, if it is determined not to allocate the dedicated ranging code for transmitting the ARQ feedback message, the transmitting unit determines whether to immediately allocate the dedicated resource for transmitting the ARQ feedback message in step 521.

When determining to allocate the dedicated resource for transmitting the ARQ feedback message in step 521, the transmitting unit proceeds to step 513 to allocate the dedicated resource for transmitting the ARQ feedback message to the receiving unit, generates and transmits the corresponding resource allocation message to the receiving unit. Thereafter, the transmitting unit repeats the subsequent steps.

In contrast, when not determining to allocate the dedicated resource for transmitting the ARQ feedback message in step 521, the transmitting unit receives the ARQ feedback message from the receiving unit using a general procedure in step 523 and proceeds to step 517. For example, the transmitting unit may receive the resource request message transmitted from the receiving unit in a contention manner, allocate the resource accordingly, and receive the ARQ feedback message from the receiving unit over the allocated resource.

Herein, the ARQ feedback message may be constituted as an ARQ feedback Information Element (IE) as shown in Table 1. Table 1 shows an example of the ARQ feedback message which supports both of the cumulative ACK scheme and the selective ACK scheme.

TABLE 1

| Syntax | Size(bit) | Notes |
| --- | --- | --- |
| ARQ_feedback_IE(LAST){ | variable | |
| Flow ID | 4 | The ID of the flow being referenced |
| LAST | 1 | 0 = More ARQ Feedback IE in the list |
| | | 1 = Last ARQ Feedback IE in the list |
| FLAG | 1 | 0 = Cumulative ACK |
| | | 1 = Selective ACK MAP existence |

TABLE 1-continued

| Syntax | Size(bit) | Notes |
|---|---|---|
| SN | 10 | FLAG = 0, ARQ block up to and including SN has been received successfully.<br>FLAG = 1, ARQ block less than SN has been received successfully. |
| While(FLAG == 1) { | | |
| Selective ACK MAP | 8 | Each bit represents ACK or NACK of corresponding ARQ block. '0' is NACK and '1' is ACK.<br>First MSB of first ACK MAP represents ACK or NAK information of SN.<br>Contiguous bits after first MSB of first ACK MAP is corresponding to contiguous SN. |
| FLAG | 1 | 0 = No more selective ACK MAP<br>1 = Another set of selective ACK MAP and FLAG follows |
| } | | |
| Reserved | variable | Byte alignment |
| } | | |

Herein, the ARQ feedback IE includes a Flow ID field indicating the ID of the referenced flow, a LAST field indicating whether there are more ARQ feedback IEs, a FLAG field indicating the type (the cumulative ACK scheme or the selective ACK scheme) of the ARQ feedback IE, and an SN Field indicating a sequence number of the ARQ block. When the FLAG field indicates the cumulative ACK scheme, the SN field implies a successful reception of the ARQ block of the corresponding SN field and the ARQ blocks ahead of the corresponding SN field. When the FLAG field indicates the selective ACK scheme, the SN field implies a successful reception of the ARQ blocks ahead of a corresponding SN field. When the FLAG field indicates the selective ACK scheme, the ARQ feedback IE further includes the Selective ACK MAP field indicating error occurrence information of the ARQ block of the SN field and the ARQ blocks following the SN field, and the FLAG field indicating whether there is another Selective ACK MAP field.

The basic size fixed in the ARQ feedback message of Table 1 is 2 bytes (i.e., 16 bits) including the Flow ID field, the LAST field, the FLAG field, and the SN field in the ARQ feedback message. When a 2-byte MAC header used to transmit every data in the MAC layer is added, the total length of the ARQ feedback message finally transmitted to the transmitting unit is 4 bytes. Yet, in the selective ACK scheme, the Selective ACK MAP field and the FLAG field are added to the ARQ feedback message. When the FLAG field is set to '1', the Selective ACK MAP is added continuously. In this case, when the 2-byte MAC header is attached, the total length of the ARQ feedback message transmitted to the transmitting unit always exceeds 4 bytes.

The receiving unit may immediately determine and change whether to generate and transmit the ARQ feedback message in the cumulative ACK scheme or in the selective ACK scheme based on an error occurrence pattern of the received data. When allocating the dedicated resource for fast delivery of the ARQ feedback message and conforming to the ARQ feedback message format of Table 1, the transmitting unit allocates only the 4-byte dedicated resource. If transmitting the ARQ feedback message using the cumulative ACK scheme, the receiving unit may transmit the ARQ feedback message using the 4-byte dedicated resource allocated. In contrast, when transmitting the ARQ feedback message using the selective ACK scheme, the receiving unit may not transmit the ARQ feedback message using the 4-byte dedicated resource allocated. Thus, the receiving unit transmits the resource request message in lieu of the ARQ feedback message. At this time, the size of the resource request message is equal to or less than 4 bytes. The transmitting unit receiving the resource request message reallocates the actual resource required for the receiving unit to transmit the ARQ feedback message. In result, the receiving unit may transmit the ARQ feedback message in the intended size.

Figure 6:
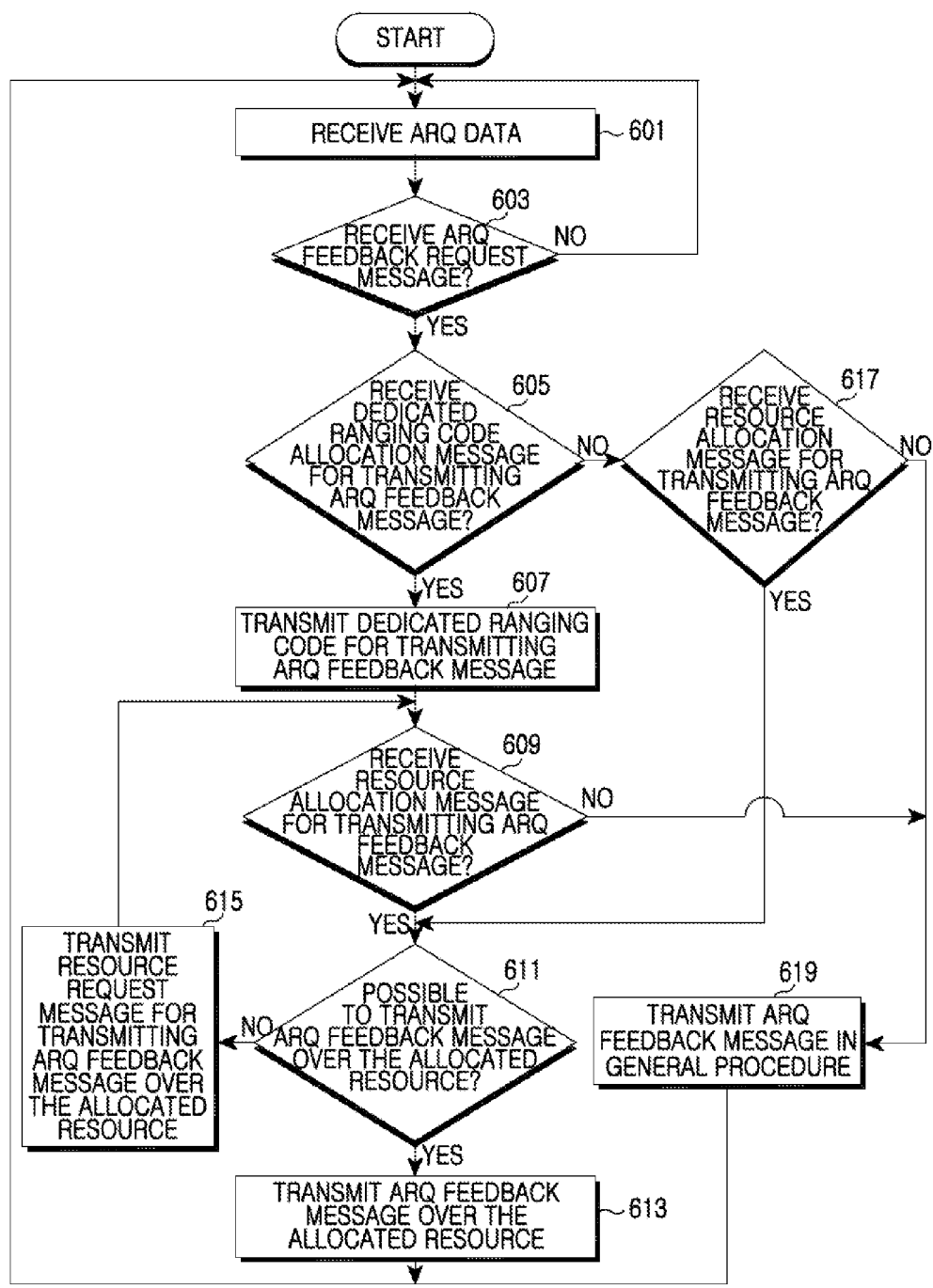
FIG. 6 illustrates a process of a receiving unit for transmitting an ARQ feedback message in a wireless communication system according to an exemplary embodiment of the present invention.

FIG. 6 illustrates a process of a receiving unit for transmitting an ARQ feedback message in a wireless communication system according to an exemplary embodiment of the present invention.

Referring to FIG. 6, the receiving unit receives the ARQ data from the transmitting unit in step 601. The receiving unit determines whether the ARQ feedback request message, which requests to transmit the ARQ feedback message for the ARQ data, is received from the transmitting unit in step 603.

If it is determined that the ARQ feedback request message is not received in step 603, the receiving unit returns to step 601.

If it is determined that the ARQ feedback request message is received in step 603, the receiving unit determines whether the dedicated ranging code allocation message for transmitting the ARQ feedback message is received from the transmitting unit in step 605. Herein, the dedicated ranging code allocation message includes information relating to the dedicated ranging code and an allocation purpose (to transmit the ARQ feedback message) of the dedicated ranging code.

When the receiving unit receives the dedicated ranging code allocation message in step 605, the receiving unit completes preparation to transmit the ARQ feedback message and transmits the dedicated ranging code allocated through the dedicated ranging code allocation message, to the transmitting unit in step 607.

In step 609, the receiving unit determines whether the resource allocation message for transmitting the ARQ feedback message is received from the transmitting unit. The resource allocation message is received in the form of a control message (e.g., A-MAP message), and includes information relating to an ID of the receiving unit and a resource allocation size. Herein, brief resource allocation information such as resource allocation time or allocated resource size may be discussed between the transmitting unit and the receiving unit at an initial system access. Alternatively, the receiving unit may acquire the resource allocation time or the size of the allocated resource from the ARQ feedback request message received from the transmitting unit.

When receiving the resource allocation message in step 609, the receiving unit determines whether it is possible to transmit the ARQ feedback message over the allocated dedicated resource by comparing the size of the dedicated resource allocated through the resource allocation message with the size of the resource required to actually transmit the ARQ feedback message in step 611. Herein, the dedicated resource, which is an unsolicited bandwidth, has a fixed size to transmit the ARQ feedback message of a cumulative ACK scheme. For example, the dedicated resource may have the fixed size according to an ARQ window size.

When the size of the resource required to actually transmit the ARQ feedback message is less than or equal to the size of the allocated dedicated resource, the receiving unit may determine that it is possible to transmit the ARQ feedback message over the allocated dedicated resource. For example, when the receiving unit determines to transmit the ARQ feedback message of the cumulative ACK scheme, or when the receiving unit determines to transmit the ARQ feedback message of the selective ACK scheme but the size of the required resource for transmitting the ARQ feedback message is less than or equal to the size of the dedicated resource allocated from the transmitting unit, the receiving unit may determine that the allocated bandwidth is enough to transmit the ARQ feedback message. Thus, the receiving unit may determine that it is possible to transmit the ARQ feedback message over the allocated dedicated resource.

When the size of the resource required to actually transmit the ARQ feedback message is greater than the size of the allocated dedicated resource, the receiving unit may determine that it is infeasible to transmit the ARQ feedback message over the allocated dedicated resource. For example, when the receiving unit determines to transmit the ARQ feedback message of the selective ACK scheme and the size of the necessary resource for transmitting the ARQ feedback message is greater than the size of the dedicated resource allocated from the transmitting unit, the receiving unit may determine that the allocated bandwidth is insufficient to transmit the ARQ feedback message. Accordingly, the receiving unit may determine that it is infeasible to transmit the ARQ feedback message through the allocated dedicated resource. In this case, the receiving unit should be allocated the resource in the necessary size by requesting the size of the necessary resource for transmitting the ARQ feedback message of the selective ACK scheme to the transmitting unit.

Upon determining that it is possible to transmit the ARQ feedback message over the allocated dedicated resource in step 611, the receiving unit transmits the ARQ feedback message to the transmitting unit over the allocated dedicated resource in step 613 and then returns to step 601. Herein, the receiving unit may constitute the ARQ feedback message as an extension header, constitute a MPDU by attaching the ARQ feedback request message to data in a MAC layer, and transmit them to the transmitting unit. Alternatively, the receiving unit may constitute and transmit the ARQ feedback message as a separate independent control message to the transmitting unit.

In contrast, if it is determined that it is impossible to transmit the ARQ feedback message over the allocated dedicated resource in step 611, the receiving unit transmits the resource request message, in lieu of the ARQ feedback message, requesting to allocate the necessary resource for actually transmitting the ARQ feedback message, to the transmitting unit over the allocated dedicated resource in step 615 and then returns to step 609. The resource request message includes the information relating to the ID of the receiving unit, the purpose of the resource request (to deliver the ARQ feedback message), and the resource request size. Herein, the receiving unit may constitute the resource request message as the extension header, constitute the MPDU by attaching the ARQ feedback request message to data in the MAC layer, and transmit them to the transmitting unit. Alternatively, the receiving unit may constitute and transmit the resource request message as a separate independent control message to the transmitting unit.

In contrast, if it is determined that the resource allocation message is not received within a preset time in step 609, the receiving unit transmits the ARQ feedback message to the transmitting unit according to a general procedure in step 619 and returns to step 601. For example, the receiving unit may transmit the resource request message to the transmitting unit in a contention manner, be allocated the resource from the transmitting unit, and transmit the ARQ feedback message to the transmitting unit through the allocated resource.

If it is determined that the dedicated ranging code allocation message is not received in step 605, the receiving unit determines whether the dedicated resource allocation message for transmitting the ARQ feedback message is received from the transmitting unit in step 617.

Upon receiving the dedicated resource allocation message in step 617, the receiving unit proceeds to step 611.

If it is determined that the dedicated resource allocation message is not received within the preset time in step 617, the receiving unit transmits the ARQ feedback message to the transmitting unit according to the general procedure in step 619 and returns to step 601.

Figure 7:
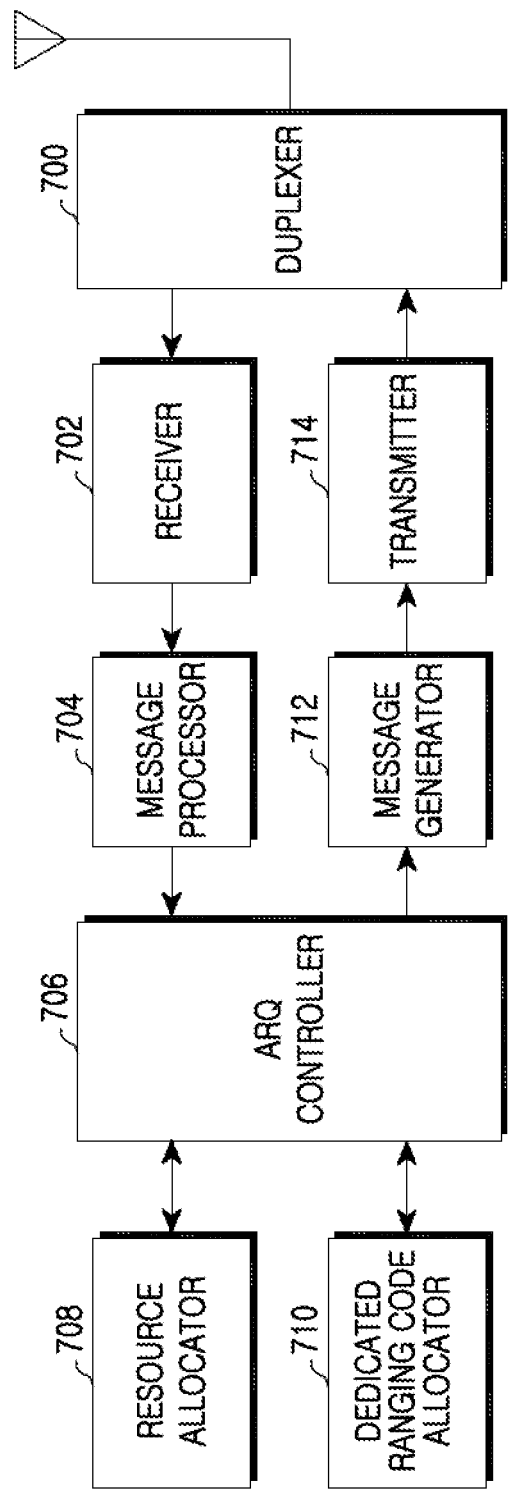
FIG. 7 illustrates a block structure of a transmitting unit in a wireless communication system according to an exemplary embodiment of the present invention.

FIG. 7 is a block diagram of a transmitting unit in a wireless communication system according to an exemplary embodiment of the present invention.

Referring to FIG. 7, the transmitting unit includes duplexer 700, a receiver 702, a message processor 704, an ARQ controller 706, a resource allocator 708, a dedicated ranging code allocator 710, a message generator 712, and a transmitter 714.

The duplexer 700 transmits a transmit signal output from the transmitter 714 via an antenna, and provides a received signal from the antenna to the receiver 702 in the duplexing manner. For example, using a Time Division Duplexing (TDD) scheme, the duplexer 700 transmits the transmit signal fed from the transmitter 714 via the antenna in the transmission interval, and forwards the received signal from the antenna to the receiver 702 in a reception interval.

The receiver 702 converts the Radio Frequency (RF) signal output from the duplexer 700 to a baseband signal, demodulates and decodes the baseband signal. For example, the receiver 702 includes an RF processing block, a demodulating block, and a channel decoding block. The RF processing block converts the RF signal received via the antenna to the baseband signal. The demodulating block may include a Fast Fourier Transform (FFT) operator for extracting data in each subcarrier from the signal output from the RF processing block. The channel decoding block may include a demodulator, a deinterleaver, and a channel decoder.

The message processor 704 analyzes a message fed from the receiver 702 and provides the ARQ feedback related information to the ARQ controller 706.

The ARQ controller 706 processes the ARQ feedback related information output from the message processor 704, generates and transmits information to transmit in relation to the ARQ feedback to the message generator 712. The ARQ controller 706 controls the ARQ with the receiving unit using the ARQ feedback related information. For example, when receiving NACK information from the message processor 704, the ARQ controller 706 controls to retransmit data for the NACK information. When receiving ACK information from the message processor 704, the ARQ controller 706 recognizes that the transmission of the data for the ACK information is successful.

In addition, the ARQ controller 706 provides the message generator 712 with information for generating the ARQ feedback request message, allocates a dedicated resource for transmitting the ARQ feedback message by requesting to the resource allocator 708, provides the message generator 712 with the resource allocation information for generating the resource allocation message, and then waits to receive the ARQ feedback information. Upon receiving the ARQ feedback information from the message processor 704, the ARQ controller 706 may update an ARQ window using the ARQ feedback information. If the resource request information requesting the necessary resource for actually transmitting the ARQ feedback message is received from the message processor 704 instead of the ARQ feedback information, the ARQ controller 706 may reallocate the requested resource by requesting to the resource allocator 708 and provide the message generator 712 with the resource allocation information for generating the resource allocation message. After providing the information for generating the ARQ feedback request message to the message generator 712, the ARQ controller 706 allocates a dedicated ranging code for transmitting the ARQ feedback message by requesting to the dedicated ranging code allocator 710, and provides the message generator 712 with the dedicated ranging code allocation information for generating the dedicated ranging code allocation message. Upon receiving the allocated dedicated ranging code from the message processor 704, the ARQ controller 706 may allocate the dedicated resource for transmitting the ARQ feedback message by requesting to the resource allocator 708.

The resource allocator 708 allocates the dedicated resource for transmitting the ARQ feedback message according to the request of the ARQ controller 706, and provides the allocated dedicated resource to the ARQ controller 706.

The dedicated ranging code allocator 710 allocates the dedicated ranging code for transmitting the ARQ feedback message according to the request of the ARQ controller 706, and provides the allocated dedicated ranging code to the ARQ controller 706.

The message generator 712 generates the message with various information provided from the ARQ controller 706 and outputs the generated message to the transmitter 714.

The transmitter 714 converts the message output from the message generator 712 to an RF signal and transmits the RF signal to the duplexer 700. For example, the transmitter 714 includes a channel encoding block, a modulating block, and an RF processing block. The channel encoding block may include a channel encoder, an interleaver, and a modulator. Considering an Orthogonal Frequency Division Multiplexing (OFDM) system, the modulating block may include an Inverse FFT (IFFT) operator for loading the data output from the channel encoding block to a plurality of orthogonal subcarriers. In a case of a Code Division Multiple Access (CDMA) system, the modulating block may include a code spread modulator. The RF processing block converts the baseband signal output from the modulating block to an RF signal and transmits the RF signal to the duplexer 700.

Figure 8:
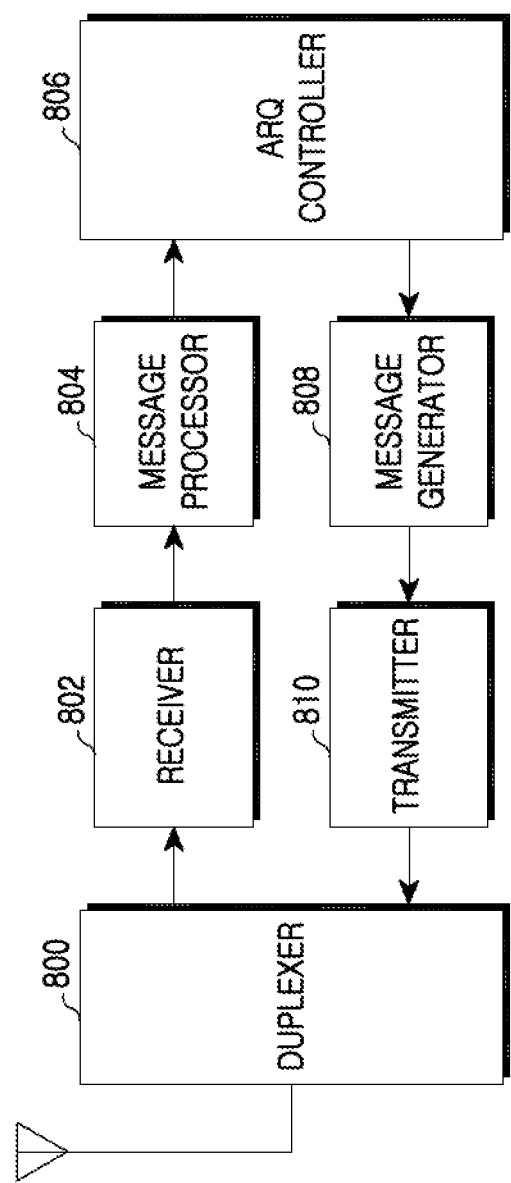
FIG. 8 illustrates a block structure of a receiving unit in a wireless communication system according to an exemplary embodiment of the present invention.

FIG. 8 is a block diagram of a receiving unit in a wireless communication system according to an exemplary embodiment of the present invention.

Referring to FIG. 8, the receiving unit includes a duplexer 800, a receiver 802, a message processor 804, an ARQ controller 806, a message generator 808, and a transmitter 810.

The duplexer 800 transmits a transmit signal output from the transmitter 810 via an antenna, and provides a received signal from the antenna to the receiver 802 in a duplexing manner. For example, using a TDD scheme, the duplexer 800 transmits the transmit signal fed from the transmitter 810 via the antenna in the transmission interval, and forwards the received signal from the antenna to the receiver 802 in a reception interval.

The receiver 802 converts the RF signal output from the duplexer 800 to a baseband signal, demodulates and decodes the baseband signal. For example, the receiver 802 includes an RF processing block, a demodulating block, and a channel decoding block. The RF processing block converts the RF signal received via the antenna to the baseband signal. The demodulating block may include an FFT operator for extracting data in each subcarrier from the signal output from the RF processing block. The channel decoding block may include a demodulator, a deinterleaver, and a channel decoder.

The message processor 804 analyzes a message received from the receiver 802 and provides ARQ feedback related information to the ARQ controller 806.

The ARQ controller 806 processes the ARQ feedback related information output from the message processor 804, generates and transmits information to transmit in relation to the ARQ feedback to the message generator 808. The ARQ controller 806 controls the ARQ with a transmitting unit using the ARQ feedback related information. For example, when ARQ data received from the transmitting unit has an error, the ARQ controller 806 controls to transmit NACK information to the transmitting unit. In contrast, when the ARQ data received from the transmitting unit does not have an error, the ARQ controller 806 controls to transmit ACK information to the transmitting unit.

In addition, the ARQ controller 806 receives information requesting to transmit the ARQ feedback message and resource allocation information for transmitting the ARQ feedback message from the message processor 804. The ARQ controller 806 determines whether it is possible to transmit the ARQ feedback message over an allocated dedicated resource by comparing the size of the dedicated resource allocated through the resource allocation information with the size of a necessary resource for actually transmitting the ARQ feedback message. Herein, the dedicated resource, which is an unsolicited bandwidth, has a fixed size to transmit the ARQ feedback message of a cumulative ACK scheme. For example, the dedicated resource may have the fixed size according to an ARQ window size. When it is possible to transmit the ARQ feedback message over the allocated dedicated resource, for example, when the receiving unit determines to transmit the ARQ feedback message of the cumulative ACK scheme or when the receiving unit determines to transmit the ARQ feedback message of a selective ACK scheme but the size of the necessary resource for transmitting it is less than or equal to the size of the dedicated resource allocated from the transmitting unit, the ARQ controller 806 provides the message generator 808 with the ARQ feedback information for generating the ARQ feedback message. In contrast, when it is impossible to transmit the ARQ feedback message over the allocated dedicated resource, for example, when the receiving unit determines to transmit the ARQ feedback message of the selective ACK scheme and the size of the necessary resource for transmitting it is greater than the size of the dedicated resource allocated from the transmitting unit, the ARQ controller 806 provides the message generator 808 with the resource request information, which requests the necessary resource for actually transmitting the ARQ feedback message, for generating the resource request message.

Accordingly, when receiving the resource allocation information which allocates the requested resource from the message processor 804, the ARQ controller 806 may provide the message generator 808 with the ARQ feedback information for generating the ARQ feedback message. The ARQ controller 806 may receive from the message processor 804 the information requesting to transmit the ARQ feedback message and the dedicated ranging code allocation information for transmitting the ARQ feedback message. In this case, the ARQ controller 806 may complete preparation to transmit the ARQ feedback message, provide the allocated dedicated ranging code to the message generator 808, and wait to receive the resource allocation information for transmitting the ARQ feedback message.

The message generator 808 generates the message with various information provided from the ARQ controller 806 and outputs the generated message to the transmitter 810.

The transmitter 810 converts the message output from the message generator 808 to an RF signal and transmits the RF signal to the duplexer 800. For example, the transmitter 810 includes a channel encoding block, a modulating block, and an RF processing block. The channel encoding block may include a channel encoder, an interleaver, and a modulator. Considering an OFDM system, the modulating block may include an IFFT operator for loading the data output from the channel encoding block to a plurality of orthogonal subcarriers. In case of a CDMA system, the modulating block may include a code spread modulator. The RF processing block converts the baseband signal output from the modulating block to an RF signal and transmits the RF signal to the duplexer 800.

Exemplary embodiments of the present invention may be applied to the receiving unit at the same time. The receiving unit may adaptively select an exemplary embodiment of the present invention depending on the ARQ feedback scheme.

Alternatively, when a resource for transmitting the ARQ feedback message is allocated in a physical layer of the transmitting unit, the size of the resource for transmitting the ARQ feedback message is generally smaller than one physical channel in size. Accordingly, the transmitting unit may allocate the resource to receive the ARQ feedback message from one or more receiving units over one physical channel.

As set forth above, when the transmitting unit requests the receiving unit to transmit the ARQ feedback message in the wireless communication system, the receiving unit transmits the ARQ feedback message to the transmitting unit without contention. Therefore, the transmission delay of the ARQ feedback message may be reduced and the update speed of the ARQ window may be increased, thus enhancing the overall system throughput.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for receiving an Automatic Repeat reQuest (ARQ) feedback message at a transmitting unit in a wireless communication system, the method comprising:
   transmitting an ARQ feedback request message to a receiving unit;
   allocating to the receiving unit a fixed-size resource for transmitting the ARQ feedback message, the fixed-size resource comprising an unsolicited bandwidth, generating the fixed-size resource and transmitting the fixed-size resource to the receiving unit; and
   receiving the ARQ feedback message from the receiving unit over the allocated fixed-size resource when determined that a size of the allocated fixed-size resource is greater than or equal to a size of the ARQ feedback message, and receiving a resource request message from the receiving unit over the allocated fixed-size resource when determined that the size of the allocated fixed-size resource is less than the size of the ARQ feedback message.

2. The method of claim 1, further comprising transmitting a resource allocation message to the receiving unit, wherein the resource allocation message comprises an A-MAP message.

3. The method of claim 1, wherein the allocated fixed-size resource is of a size required to transmit the ARQ feedback message according to a cumulative ACKnowledge (ACK) scheme.

4. The method of claim 1, wherein the resource request message is constituted in an extension header.

5. The method of claim 1, wherein the resource request message comprises information relating to a size of the resource needed to transmit the ARQ feedback message.

6. The method of claim 1, further comprising:
   when receiving the resource request message from the receiving unit over the allocated fixed-size resource, allocating a resource of a size required for the receiving unit to transmit the ARQ feedback message; and
   receiving the ARQ feedback message from the receiving unit over the allocated resource of the size required by the receiving unit.

7. The method of claim 1, further comprising:
   transmitting ARQ data to the receiving unit; and
   transmitting an ARQ feedback request message which requests the receiving unit to transmit an ARQ feedback message with respect to the ARQ data.

8. The method of claim 7, further comprising, after the transmitting of the ARQ feedback request message:
   allocating a dedicated ranging code for transmitting the ARQ feedback message, to the receiving unit; and
   receiving the allocated dedicated ranging code from the receiving unit.

9. A method for transmitting an Automatic Repeat reQuest (ARQ) feedback message at a receiving unit in a wireless communication system, the method comprising:
   receiving an ARQ feedback request message from a transmitting unit;
   being allocated from the transmitting unit a fixed-size resource for transmitting an ARQ feedback message, the fixed-size resource comprising an unsolicited bandwidth;
   when determined that a size of the allocated fixed-size resource is greater than or equal to a size of the ARQ feedback message, transmitting the ARQ feedback message to the transmitting unit over the allocated fixed-size resource; and
   when determined that the size of the allocated fixed-size resource is less than the size of the ARQ feedback message, transmitting a resource request message to the transmitting unit over the allocated fixed-size resource.

10. The method of claim 9, further comprising:
    receiving a resource allocation message from the transmitting unit,
    wherein the resource allocation message comprises an A-MAP message.

11. The method of claim 9, wherein the allocated fixed-size resource is of a size required to transmit the ARQ feedback message according to a cumulative ACKnowledge (ACK) scheme.

12. The method of claim 9, wherein the resource request message is constituted in an extension header.

13. The method of claim 9, wherein the resource request message comprises information relating to a size of the resource needed to transmit the ARQ feedback message.

14. The method of claim 9, further comprising:
when the resource request message is transmitted to the transmitting unit over the allocated fixed-size resource, being allocated a resource of a size required to transmit the ARQ feedback message from the transmitting unit; and
transmitting the ARQ feedback message to the transmitting unit over the allocated resource of the size required to transmit the ARQ feedback message.

15. The method of claim 9, further comprising:
receiving ARQ data from the transmitting unit; and
receiving from the transmitting unit an ARQ feedback request message which requests to transmit an ARQ feedback message with respect to the ARQ data.

16. The method of claim 15, further comprising, after the receiving of the ARQ feedback request message:
being allocated a dedicated ranging code for transmitting the ARQ feedback message, from the transmitting unit; and
transmitting the allocated dedicated ranging code to the transmitting unit.

17. An apparatus for receiving an Automatic Repeat reQuest (ARQ) feedback message at a transmitting unit in a wireless communication system, the apparatus comprising:
a transmitter for transmitting an ARQ feedback request message to a receiving unit;
a resource allocator for allocating to the receiving unit a fixed-size resource for transmitting an ARQ feedback message, the fixed-size resource comprising an unsolicited bandwidth, the resource allocator further generating the fixed-size resource and transmitting the fixed-size resource to the receiving unit; and
a receiver for receiving the ARQ feedback message from the receiving unit over the allocated fixed-size resource when determined that a size of the allocated fixed-size resource is greater than or equal to a size of the ARQ feedback message, and receiving a resource request message from the receiving unit over the allocated fixed-size resource when determined that the size of the allocated fixed-size resource is greater than or equal to the size of the ARQ feedback message.

18. The apparatus of claim 17, further comprising:
a transmitter for transmitting a resource allocation message to the receiving unit,
wherein the resource allocation message comprises an A-MAP message.

19. The apparatus of claim 17, wherein the allocated fixed-size resource is of a size required to transmit the ARQ feedback message according to a cumulative ACKnowledge (ACK) scheme.

20. The apparatus of claim 17, wherein the resource request message is constituted in an extension header.

21. The apparatus of claim 17, wherein the resource request message comprises information relating to a size of the resource needed to transmit the ARQ feedback message.

22. The apparatus of claim 17, wherein the resource allocator, when receiving the resource request message from the receiving unit over the allocated fixed-size resource, allocates a resource of a size required for the receiving unit to transmit the ARQ feedback message, and
the receiver receives the ARQ feedback message from the receiving unit over the allocated resource of the size required by the receiving unit.

23. The apparatus of claim 17, further comprising:
a transmitter for transmitting ARQ data to the receiving unit and for transmitting an ARQ feedback request message which requests the receiving unit to transmit an ARQ feedback message with respect to the ARQ data.

24. The apparatus of claim 23, further comprising:
a dedicated ranging code allocator for, after transmitting the ARQ feedback request message, allocating a dedicated ranging code for transmitting the ARQ feedback message, to the receiving unit,
wherein the receiver receives the allocated dedicated ranging code from the receiving unit.

25. An apparatus for transmitting an Automatic Repeat reQuest (ARQ) feedback message at a receiving unit in a wireless communication system, the apparatus comprising:
a receiver receiving an ARQ feedback request message from a transmitting unit;
an ARQ controller being allocated from the transmitting unit a fixed-size resource for transmitting an ARQ feedback message, the fixed-size resource comprising an unsolicited bandwidth, comparing a size of the allocated fixed-size resource with a size of a resource needed for transmitting the ARQ feedback message, and controlling a transmitter to transmit at least one of the ARQ feedback message and a resource request message to the transmitting unit over the allocated fixed-size resource according to a result of the comparison; and
the transmitter for transmitting the ARQ feedback message to the transmitting unit over the fixed-size resource allocated when determined that the size of the allocated fixed-size resource is greater than or equal to the size of the resource needed for transmitting the ARQ feedback message, and transmitting a resource request message to the transmitting unit over the allocated fixed-size resource when determined that the allocated fixed-size resource is less than the size of the resource needed for transmitting the ARQ feedback message.

26. The apparatus of claim 25, further comprising:
a receiver for receiving a resource allocation message from the transmitting unit,
wherein the resource allocation message comprises an A-MAP message.

27. The apparatus of claim 25, wherein the allocated fixed-size resource is of a size required to transmit the ARQ feedback message according to a cumulative ACKnowledge (ACK) scheme.

28. The apparatus of claim 25, wherein the resource request message is constituted in an extension header.

29. The apparatus of claim 25, wherein the resource request message comprises information relating to a size of the resource needed to transmit the ARQ feedback message.

30. The apparatus of claim 25, wherein the ARQ controller, when transmitting the resource request message to the transmitting unit over the allocated fixed-size resource, is allocated a resource of a size required to transmit the ARQ feedback message from the transmitting unit, and
the transmitter transmits the ARQ feedback message to the transmitting unit over the allocated resource of the size required to transmit the ARQ feedback message.

31. The apparatus of claim 25, further comprising:
a receiver for receiving ARQ data from the transmitting unit and for receiving from the transmitting unit an ARQ feedback request message which requests to transmit an ARQ feedback message with respect to the ARQ data.

32. The apparatus of claim 31, wherein the ARQ controller, after receiving the ARQ feedback request message, is allocated a dedicated ranging code for transmitting the ARQ feedback message, from the transmitting unit, and the transmitter transmits the allocated dedicated ranging code to the transmitting unit.

* * * * *